Oct. 12, 1943.    J. BAUM    2,331,450
RECHARGEABLE STORAGE BATTERY
Filed Nov. 28, 1939    2 Sheets-Sheet 1
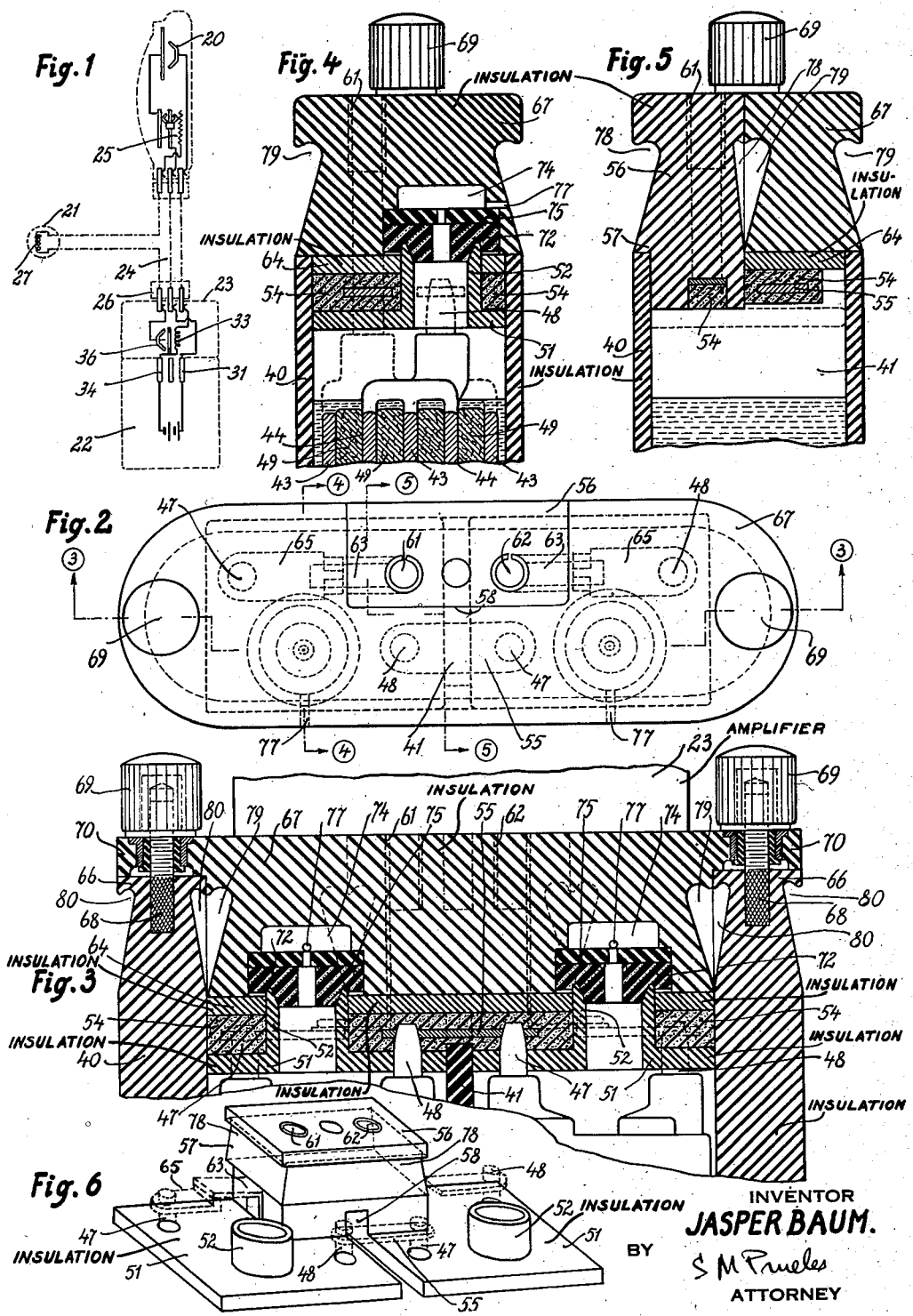
INVENTOR
JASPER BAUM.
BY
S M Prueles
ATTORNEY

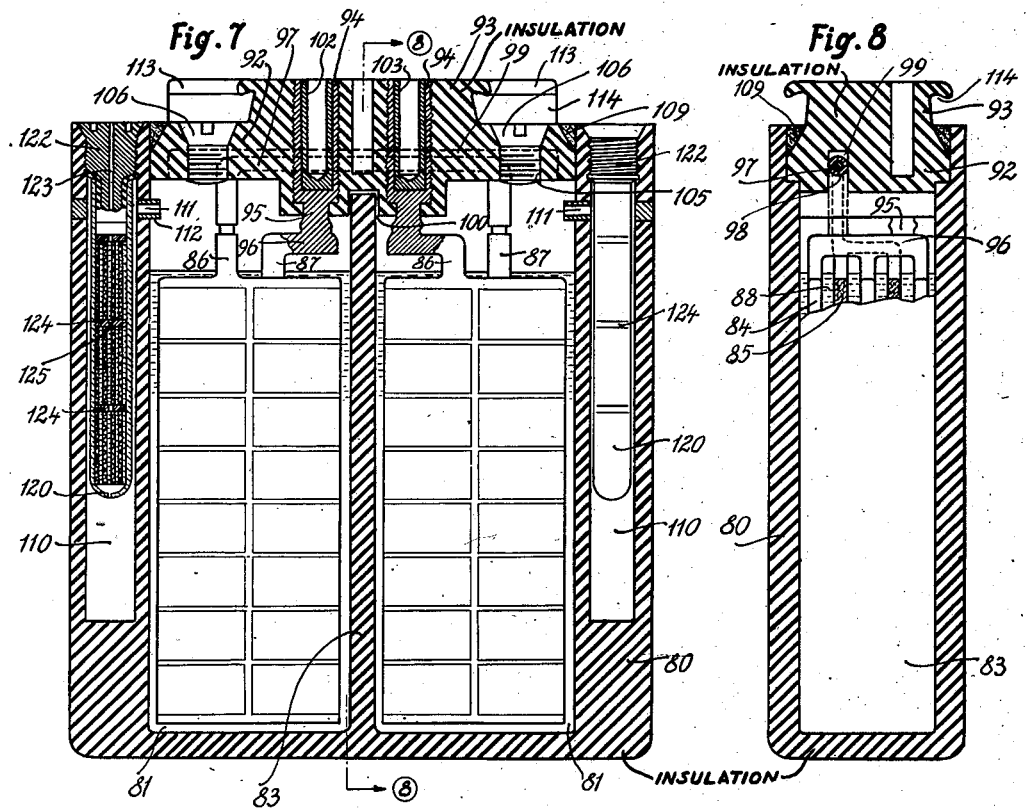
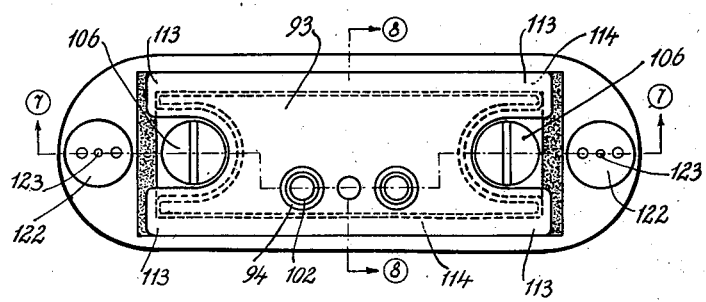

Patented Oct. 12, 1943

2,331,450

UNITED STATES PATENT OFFICE 2,331,450

RECHARGEABLE STORAGE BATTERY

Jasper Baum, Bronx, N. Y., assignor to Sonotone Corporation, Elmsford, N. Y., a corporation of New York Application November 28, 1939, Serial No. 306,462

4 Claims. (Cl. 136—6)

This application is a continuation-in-part of my copending application Serial No. 175,417, filed November 19, 1937.

This invention relates to rechargeable storage batteries and it has among its objects an improved portable electric storage battery which enables easy refitting of the battery with electrolyte while impeding creepage of electrolyte to the terminal portions of the battery of the type suitable for use as a source of energy for a hearing aid adapted to be worn by a person or for similar applications.

The foregoing and other objects of the invention will be best understood from the accompanying drawings wherein Fig. 1 is a diagrammatic view of a typical wearable hearing aid suitable for inconspicuous wear by the user;

Fig. 2 is a plan view of the battery of Fig. 3;

Fig. 3 is a vertical sectional view through a rechargeable storage battery exemplifying the invention along line 3—3 of Fig. 2;

Figs. 4 and 5 are cross sectional views through the battery along lines 4—4 and 5—5, respectively, of Fig. 2;

Fig. 6 is a perspective view of the cell covers and the terminal block mounted on the battery cells;

Fig. 7 is a vertical sectional view along line 7—7 of Fig. 9 illustrating a storage battery exemplifying another form of the invention;

Fig. 8 is a vertical sectional view along line 8—8 of Fig. 7; and

Fig. 9 is a plan view of the battery of Fig. 7.

Most of the deafened are very sensitive and seek to conceal their impairment. Accordingly, a satisfactory hearing aid device for supplying a deafened person with amplified hearing inducing sound energy must not only be able to respond to the required important speech frequencies and operate satisfactorily under all conditions of use without special attention and frequent reconditioning, but they must also be suitable for comfortable and inconspicuous wear on the body of the user.

As shown in Fig. 1, hearing aids for the deafened usually consist of a transmitter microphone 20, a receiver 21, a supply battery 22 and an amplified 23 which are interconnected by a flexible cord 24 and a control unit 25 so as to supply to the winding 27 of the receiver amplified sound energy corresponding to the sound waves impinging on the microphone. In such hearing aid, the battery 22, which usually serves as a support for the amplifier unit, must supply direct current to the amplifier input circuit leading from one battery terminal 31, by way of a cord lead and the control unit 25, to microphone 20, then back over another cord lead through the amplifier winding 33 to the other battery terminal 34, as well as to the amplier output circuit leading from the same battery terminal 31, by way of the cord lead and the control unit 25, over the receiver winding 27 and the amplifier microphone 36 to the other battery terminal 34.

Since such hearing aid device is without practical value unless it is suitable for inconspicuous wear by the user and is foolproof in operation, the battery which supplies these circuits, and is usually the heaviest and most bulky element of the device, must be small and light enough for hidden wear in a pocket on the body of the user and, at the same time, it must be able to supply the relatively large amount of electric current energy required for operating the hearing aid during prolonged periods of use. Although storage batteries maintain approximately constant voltage level during prolonged continuous use, heretofore only dry cell batteries were generally used in such wearable hearing aids notwithstanding the fact that the voltage of such dry cells drops very substantially when subjected to a prolonged discharge.

The principal deterrent against the use of rechargeable storage batteries for hearing aids is the fact that such batteries operate with a sulphuric acid electrolyte. Since such storage batteries for hearing aids must be small, their capacity is very limited, and they require, in most cases, a daily recharge. For each recharging operation which lasts a considerable time, about one hour for each hour of use, the vent holes of each cell have to be opened to permit the escape of gases generated during the charging operation and for refilling each cell with distilled water to maintain the required amount of the sulphuric acid electrolyte in pure condition essential for the satisfactory operation of such batteries.

The sulphuric acid electrolyte is very active and attacks metals which are used for the terminals leading to the hearing aid circuits. Since some electrolyte is entrapped in the gases discharged from the cells and reaches the top of the battery, the terminals of the battery become very quickly damaged by corrosion. Even more harm is done by the contamination of the active elements in the interior of the cell through the entry of traces of the reaction products of the acid with the metal forming the terminals.

The invention overcomes these difficulties by constructing the top of the battery casing, which is made of acid resisting insulating material and encloses the cell elements and the active electrolyte, so as to permit ready refilling of the cells prior to each recharging operation through holes in the top of the casing and to effectively impede creepage of electrolyte to the terminals of the battery and the formation of matter injurious to the enclosed cell elements on the top portion of the cells.

In accordance with the invention, the portions of the insulating battery tops holding the terminal contacts and their acid non-resistant connections to the cells are located at a higher level than the portions of the top having the refilling holes; and the portion of the top containing the filling holes are so constructed and arranged as to effectively impede electrolyte or liquid discharged adjacent said holes from creeping to the terminal contacts located at said higher level, and forming thereon traces of matter that might enter the cells and injure their active elements.

A storage battery for a hearing aid exemplifying the invention is shown in Figs. 2 to 6. It comprises a flat casing 40 of an acid resisting insulating material, such as hard rubber, divided into two cells by a partition wall 41. Depending on the requirements, more cells may be provided in the casing.

Each cell contains two sets of electrode plates 43, 44 of opposite polarity connected by bridging members extending above the plates to upwardly projecting terminal posts 47 and 48, the individual plates being separated by porous spacers 49 formed of acidproof material such as bagasse. The electrode assembly of each cell is individually enclosed by a cell cover 51 extending between the cell walls so as to leave a space above each electrode assembly. Each cell cover has an upwardly extending short filling tube 52 for filling the cell with electrolyte and permit refilling of the cell as well as the discharge of the gases generated in the cell during the charging operations. The two terminal posts 47, 48 of each cell extend through suitable cover openings into the sealing cavity 54 extending above the cell covers below the level of the upper edges of the casing walls. Suitable terminal posts 47, 48 of opposite polarity of the adjacent battery cells are connected by a connector strap 55, of lead, for connecting the adjacent cells in series.

A terminal block 56 of insulating material having a shoulder portion 57 fitting one side wall of the casing and a slot 58 fitting over the partition wall 41 of the casing extends above the cell covers 51 to a higher level than the edges of the battery casing.

In suitable openings in the top of the terminal block are mounted terminal contacts 61, 62, such as split cylindrical sleeves of spring metal arranged to provide supply connections to the external circuit, such as the plug terminals of the hearing aid amplifier unit 23 adapted to be mounted on the battery in the way indicated in Fig. 1, or the terminals of the cord plug 26 if the hearing aid is used without the amplifier. The lower ends of the terminal sleeves 61, 62 are connected as by tail strips 63 to connector straps 65 extending from the end terminal posts of the two serially connected battery cells and complete the circuit connections from the battery cell to the external terminal contact sleeves 61, 62 of the battery.

As shown in Figs. 2 and 6, all connections between the acidproof terminal posts 47 and 48 of the battery and the external battery terminals 61, 62 are confined within the sealing cavity adjoining the bottom portion of the terminal block.

The sealing cavity 54 is filled with an insulating acidproof sealing compound which flows when heated, and the top of the cavity is then enclosed by an acid resistant insulating closure plate 64 fitting over the edges of the filling tubes 52 of the two cells and the edges of the battery casing so that after the hardening of the sealing compound, the terminal block 56, the cell covers 51, the closure plate and the compound within the sealing cavity form a solid rigid block which provides an acidproof seal between the battery cells and the terminal block. The terminal block may be made of any suitable insulating material, such as flexible rubber or hard rubber.

The two narrow end walls of the battery casing terminate at a higher level than the closure plate 64 and form clamping blocks 66 for clamping a battery cover 67 over the top of the casing walls and the closure plate 64 by means of screws 68 anchored in the clamping blocks 66 and grip nuts 69 mounted in clamping lugs 70 extending from the cover 67. The battery cover 67 fits into the space between the terminal block 56 and the clamping blocks 66 and extends over the cell closure plate 64 and the edges of the side walls of the casing 40, so that when the cover 67 is in place, its upper surface is substantially level with the upper surface of the terminal block and serves as a firm support for the amplifier unit 23.

The edges of refilling tube 52 of each battery cell are sealed by a sealing ring 72, of flexible rubber, removably mounted in cavities provided in the bottom of the battery cover. Each cavity forms a compartment 74 communicating through a hole in a spacer washer 75 overlying the sealing ring 72 with the interior of the cell to permit gases evolved in the cell during the operation of the battery to escape by way of the hole in the sealing ring 72 and the spacer 75 into the compartment 74, and therefrom through a hole 77 in the side wall of the cover.

By placing in the gas outlet compartments 74 filter units which permit the escape of gas but hold back drops of electrolyte entrapped in the discharged gases, escape and leakage of electrolyte from the battery is prevented. An effective filter unit for such gas outlet compartments which serves also as an acid neutralizer and acid indicator may be made by spreading on porous glass thread fabric a suitable neutralizing compound, such as sodium carbonate or calcium chloride, to which is added some indicator substance, such as phenolphthalein, and forming out of such fabric filter pads fitting into the filter compartments 74 of the cover. Such filter unit will neutralize any traces of electrolyte reaching the outlet compartments 74 and at the same time indicate by its color the extent of its effectiveness as a neutralizing agent. By examining the filter unit from time to time upon removal of the sealing ring from its seat in the cover, the condition of the filter pads may be readily checked and replaced when required.

To assure that creepage of electrolyte from the filling holes 52 to the upper surface of the terminal block 56 with its exposed metallic battery terminals 61, 62 on the top thereof is effectively impeded, the upper surface of the terminal block is made sufficiently higher than the upper level of the filling holes 52 so that the creepage path between the filling holes and the top of the terminal block is relatively long and so shaped as to impede the creepage of electrolyte.

I have found that for most practical purposes it is enough if the upper level of the trminal block is made at least about one-half an inch higher than the upper level of the filling openings. The upper surface of the camping blocks 66 in which the metallic screws 68 are anchored is similarly located at a level at least about one-half an inch higher than the top plate 64 of the battery so as to effectively impede the creepage of electrolyte from the cell openings toward the screws and to provide a long leakage path between the cell openings and the screws.

In addition, an endless under-cut deflecting depression 78 is provided on the four sides of the terminal block 56 and a similar deflecting depression 79 is provided on the side surfaces of the cover, the depressions 78 and 79 having downwardly curved upper surfaces shaped to deflect any traces of electrolyte tending to creep toward the top of the terminals or toward the top of the cells in downward direction. The clamping blocks are likewise provided with similar under-cut deflecting depressions 80. The foregoing arrangement assures that difficulties due to creepage of electrolyte toward the upper surfaces of the terminal block, clamping blocks and the battery cover is for all practical purposes rendered negligible.

As shown in Figs. 3 and 4, the small vent holes 77 extending from the filter compartment 74 terminate substantially below the level of the downwardly directed upper surface of the depressions 79 so that traces of electrolyte trapped in the escaping gases discharged through the vent holes are effectively prevented from reaching the metallic parts on the top of the terminal block, or the battery cover. The construction of the battery described above thus assures a high degree of safety to the user, and if he observes the minor precaution of wiping off the top of the battery with its terminal block 56 and the cover each time before he mounts the cover in place, he is assured that he may use his hearing aid and wear the battery all day long without danger of being harmed by the escape of electrolyte, particularly, if he observes the precaution that each time after the charging is completed, the battery is turned up-side-down and shaken one or two times so as to eject any loose drops of electrolyte not absorbed by the porous electrode spacers 49, before the cover is screwed in place.

In Figs. 7 to 9 is shown another form of rechargeable storage battery exemplifying the invention. It comrises a casing 80 of acid-resisting insulating material, such as hard rubber, having relatively thin side walls joined by thick rounded end walls into a rigid casing which is flat enough for substantially hidden wear in a pocket of the user's clothing without making him conspicuous. The casing 80 is shown divided into two electrode cell compartments 81 by a partition 83. Depending on the requirements, more cells may be provided in such flat casing. Each cell contains two sets of electrode plates 84 and 85 of opposite polarity interconnected by bridging yokes 86, 87, respectively, the individual plates being separated by porous spacers 88 of suitable acid-proof fibrous material which holds absorbed the required quantity of the electrolyte. Standard positive and negative electrode plates and separators heretofore generally used in similar portable batteries may be employed. The electrode assembly of each cell described above forms a self-contained unit which is held together by the bridging yoke members on the top of the electrode assembly, and when inserted into the battery casing it fits loosely into its compartment.

A battery cover 92, likewise of acid-proof material, such as hard rubber, fitting into the opening of the battery casing serves as an enclosure for the cell compartments.

The battery cover 92 is provided with an upwardly projecting terminal block 93 in which are imbedded two acid-proof metallic connector sleeves 94, of lead, for instance, having downwardly protruding projections 95 which are joined, as by burning, to terminal lugs 96 extending from an electrode yoke 86 of one cell electrode assembly and an electrode assembly yoke 87 of opposite polarity of the adjacent electrode assembly, in the way shown in Figs. 7 and 8.

A series intercommunication between the outer yoke members 86, 87 of opposite polarity of the two cell electrode assemblies is provided by a bridging connector 97 of lead which is covered by an insulating sleeve of soft rubber 98 and may be clamped or imbedded in the groove 99 provided in the underside of the cover, the downwardly projecting ends of the connector 97 being joined, by burning, to the outer battery cell yoke members 86, 87 of opposite polarity.

In manufacturing a storage battery of the type shown in Figs. 7 to 9, the cover, in which the serial connector 97 has been previously mounted, and the two cell electrode assemblies may be placed in a suitable jig in the positions which they have to occupy in the finished storage battery, whereupon the two central terminal sleeve projections 95 and the two outer projections of the series connector 97 are rigidly joined by a burning process to the terminal lugs 96 extending from the inner yoke members of opposite polarities and to the outer yoke members of opposite polarities 86, 87 of the two cell assemblies, respectively.

The cover member 92 with the two electrode assemblies joined thereto in their final relative positions form a self-supporting unit which may be inserted in its final location in the battery casing, the bottom side of the cover 92 having a groove 100 fitting over the upper edge of the partition wall 83 of the casing so as to provide a leak-proof seal between the two cell compartments. The edges of the cover are beveled to provide between the edges of the cover and the facing edges of the casing a sealing groove 109. After the battery is assembled and the cover is located in its final position flash with the casing in the way shown in Fig. 7, the sealing groove 109 is filled with an acid-proof sealing compound which flows when heated and becomes hard and congealed at ordinary temperatures so as to join the cover and the casing into a strong, tightly closed casing structure.

As shown in Figs. 7 and 8, two terminal bushings 102, 103 of a suitable acid-proof conducting material, are mounted in the connector sleeves 94 extending through the cover 92 to provide the external contact connections to the serially connected battery cells. The terminal sleeves 102, 103 are arranged to receive the downwardly projecting plugs of the amplifier unit of the hearing aid so that when the amplifier unit is mounted above the battery, the battery serves also as a support for the amplifier unit.

The cover 92 is also provided with two filling openings 105 leading to the two cell compartments, the openings 105 being closed by screw closures 106 having enlarged conically-shaped heads which are seated in and sealingly engage the conically-shaped walls of the openings 105.

In addition to the electrode cell compartments for receiving the electrode assembly of each cell, the battery casing is also provided with an intercommunicating outlet compartment 110 for each cell located in the reinforced narrow end wall sections bordering the narrow sides of the casing. Each outlet compartment 110 forms thus a downwardly extending cavity which is connected with the adjoining electrode compartment through an opening 111 extending through a wall portion of the casing at a level higher than the level in the adjacent electrode cell compartment. A short tube projection 112 extending from the opening 111 prevents the entry of electrolyte from the cell compartment into the adjacent outlet compartment when the battery is tilted in a horizontal position.

The outlet cavity serves as a trap which diverts gases escaping from the electrode compartment so as to remove any particles of electrolyte entrapped within the discharge gases and retain them in the outlet cavity, while permitting the gases and vapors entering the outlet cavity to leave the battery casing free from any traces of acid or condensable acid vapors.

The upper surface of the terminal block 93 with its metallic terminal sleeve is located at a sufficiently higher level above the upper level of the filling openings so as to effectively impede creepage of electrolyte from the cell openings toward the exposed metallic terminal portions on the top of the terminal block in the way described in connection with the battery of Figs. 2 to 6. As shown in Figs. 7 to 9, the upper portion of the terminal block 93 is provided with lateral extensions 113 shaped so as to form a supporting surface for the bottom of the amplifier unit mounted on the battery. In the side walls of the terminal block 93 is provided an endless under-cut depression 114 shaped similar to that provided on the terminal block of the battery of Figs. 2 to 6 so as to deflect downwardly traces of electrolyte tending to creep from the level of the filling openings toward the top of the terminal block.

A highly effective protective action is obtained with such outlet cavity by mounting in the cavity a downwardly projecting outlet tube 120 which is held in place by the projecting downward end of a vent plug 122. The vent plug 122 has a vent hole 123 and serves as a closure for the upper opening of the outlet compartment. The vent plug has a threaded engagement with the outlet opening and the upper surface of the plug which, as shown, is flush with the top of the battery and may be readily unscrewed by suitable grip holes in the top of the plug.

The lower end of the outlet tube 120 is provided with an opening to cause the gases and vapors evolved in the electrode compartment entering through the opening 111 into the adjoining outlet compartment 110 to be deflected downwardly till they enter the lower opening of the outlet tube 120 so that only after passing through the full length of the outlet tube 120, they are permitted to escape through the vent hole 123 of the vent plug 122 to the exterior.

The lower end of the vent outlet tube 120 terminates at a distance from the bottom of the outlet compartment so that any electrolyte or vapor condensation products entrained in the gaseous bodies escaping from the electrode compartment will be deflected to the bottom of the outlet compartment and collect there as in a sump.

The outlet tube 120 is made of transparent acid-proof material, such as glass, and is subdivided into a plurality of communicating filter compartments by perforated substantially circular partition members 124 of acid-proof material, such as soft gum rubber, having holes 125 through which gases flowing through the tube outlet pass from one compartment to the other compartment. In each of the filter compartments is placed a filter element arranged to trap electrolyte or condensed vapor but permit the outflow of gas. In order to make sure that no harmful acid escapes with the passing gases, a suitable neutralizing compound is placed in one or more of the outlet tube compartments. Various neutralizing compounds may be used for this purpose, such as sodium carbonate, calcium hydroxide, lead hydroxide, barium hydroxide, calcium chloride. By using a mixture of several neutralizing compounds, such as sodium carbonate and calcium chloride, the neutralizer body will retain the moisture required to render it fully effective. A small addition of glycerin assists in maintaining the neutralizing body moist.

Suitable acid indicating compounds are also placed in the filter compartments to indicate the condition of acid neutralizing compounds. Any of the known indicator substances may be used for this purpose, such as phenolphthalein, litmus, methyl orange or congo red.

An effective filter element which serves also as an acid neutralizer and acid indicator may be made up by spreading or sprinkling a sheet of porous thin glass-thread fabric with sodium carbonate, calcium chloride, a few drops of glycerin and some phenolphthalein. The filter sheet is then rolled up and cut into short cylindrical filter rolls which are inserted into the individual filter compartments of the outlet tube between the individual partitions 124.

In a battery equipped with such filter units, traces of acid entrained in the gases passing through the filter compartments will be neutralized by the neutralizing compound with which the gases come in contact as they flow through the compartments. As a result, the region of the filter compartments which is nearest the lower inlet opening of the filter tube will first react with the acids and this will be indicated by the change in the color of the indicator embodied in the filter element.

As a result, successive higher regions of the filter element will be called upon to act as neutralizers and the changes in the color of the successively higher regions of the filter element will indicate the process at which the neutralizing compounds are losing their effectiveness as neutralizing agents. A periodical removal of the readily unscrewed filter tube from the outlet makes it possible to check up at a glance the condition of the filter unit and either recondition the filter tube or replace it with another filter tube.

Instead of equipping each of the compartments of the filter tube with the same type of filter element, the individual compartments may be provided with the filter elements which are effective in different ways. Thus, for instance, only one of the several serially arranged outlet tube compartments may be filled with a neutralizing agent, such as granules of barium hydroxide or calcium hydroxide, so as to operate as a neutralizing compartment, while the other compartments are arranged to function only as filter compartments.

A battery constructed in the way shown in Figs. 7 to 9 and equipped with filter compartments in the way described above will effectively impede escape of acid or harmful electrolyte with the gases evolved by the battery cells and trap acid entrained in the outflowing gases and neutralize such acid.

The neutralizing capacity of the filter elements described above will remain effective for a prolonged period of time. A simple periodical check-up of the filter elements, say, once every few weeks, will indicate by the discoloration of the filter elements whether the filter elements have to be reconditioned or replaced. The filter units in themselves are very economical in manufacture and use and do not in any way detrimentally affect the operation of the battery.

The features of the invention embodied in its exemplification in the form of a hearing aid battery will be useful in many other applications of such batteries and will suggest to those skilled in the art many other modifications thereof. It is accordingly desired that in construing the breadth of the appended claims they shall not be limited to the specific exemplifications of the invention described herein.

I claim:

1. In a rechargeable storage battery suitable for a hearing aid worn in the clothing of the user, or the like, a flat casing of acid proof insulating material having two relatively wide walls and two relatively narrow walls joining said wide walls into a relatively rigid casing that is flat enough for substantially hidden inconspicuous wear in a flat position against the body of the user; said casing enclosing a vertical cell space; a top structure of insulating material united to said casing walls so as to enclose said cell space and having an upwardly facing filling opening; and electrodes and electrolyte located in said cell space; said top structure having a terminal block of acid-proof insulating material forming an upwardly-extending body part of said casing, rising substantially above the level of the other portions of said top structure having said filling opening and being confined within the lateral boundaries of said casing; said terminal block having an upwardly facing terminal surface located at a substantially higher level than said other portions of said top structure; a plurality of metallic terminal members mounted on the upper side of said terminal block and having terminal surfaces exposed through said terminal block in upward direction only; and leads interconnecting said terminal members to said electrodes having portions extending through said terminal block and being enclosed therein by solid acid-proof insulating material united to the surface of said leads so as to prevent creepage of electrolyte thereon toward said terminal members; the lateral sides of said terminal block being provided with an endless depression having relatively deep downwardly facing deflecting surfaces extending around their entire periphery for obstructing creepage of electrolyte from the regions of said cell opening beyond the regions of said deflecting surfaces.

2. In a rechargeable storage battery suitable for a hearing aid worn in the clothing of the user, or the like, a flat casing of acid proof insulating material having two relatively wide walls and two relatively narrow walls joining said wide walls into a relatively rigid casing that is flat enough for substantially hidden inconspicuous wear in a flat position against the body of the user; said casing enclosing a vertical cell space; a top wall of insulating material united to said casing walls so as to enclose said cell space and having an upwardly facing filling opening; electrodes and electrolyte located in said cell space; said top wall having a terminal block forming an integral upwardly-extending body part of said top wall, and rising from a portion of said top wall above the level of the other portions of said top wall having said filling opening; said terminal block being confined within the lateral boundaries of said casing and having an upwardly facing terminal surface located at a level substantially higher than the level of said other portions of said top wall; a plurality of metallic terminal members mounted on the upper side of said terminal block and having terminal surfaces exposed through said terminal block in upward direction only; and leads interconnecting said terminal members to said electrodes having portions extending through said terminal block and being enclosed therein by solid acid-proof insulating material united to the surface of said leads so as to prevent creepage of electrolyte thereon toward said terminal members; the lateral sides of said terminal block being provided with an endless depression having relatively deep downwardly facing deflecting surfaces extending around their entire periphery for obstructing creepage of electrolyte from the regions of said cell opening beyond the regions of said deflecting surfaces.

3. In a rechargeable storage battery suitable for a hearing aid worn in the clothing of the user, or the like, a flat casing of acid proof insulating material having two relatively wide walls and two relatively narrow walls joining said wide walls into a relatively rigid casing that is flat enough for substantally hidden inconspicuous wear in a flat position against the body of the user; said casing enclosing a vertical cell space; a top structure of insulating material united to said casing walls so as to enclose said cell space and having an upwardly facing filling opening; electrodes and electrolyte located in said cell space; a detachable cover of acid proof insulating material extending over an upwardly facing portion of said top structure for enclosing said cell opening and having downwardly facing clamping portions overlying upwardly facing clamping wall portions of said casing; clamping means for detachably joining the clamping portions of said cover to the clamping wall portions of said casing having exposed metallic junction portions confined between the facing clamping portions of said cover and said casing; the facing surfaces of the clamping portions of said cover and the clamping wall portions of said casing being located at a level substantially higher than the level of said cell opening; said top structure having a terminal block of acid-proof insulating material forming an upwardly-extending body part of said casing, rising substantially above the level of the other portions of said top structure having said filling opening; said terminal block being shaped and arranged to interfit with said cover within the lateral boundaries of said casing and having an upwardly facing terminal surface located at a substantially higher level than said other portions of said top structure; a plurality of metallic terminal members mounted on the upper side of said terminal block and having terminal surfaces exposed through said terminal block in upward direction only; and leads interconnecting said terminal members to said electrodes having portions extending through said terminal block and being enclosed therein by solid acid-proof insulating material united to the surface of said leads so as to prevent creepage of electrolyte thereon toward said terminal members.

4. A battery as defined by claim 3, characterized by the fact that the lateral sides of said terminal block are provided with an endless depression having relatively deep downwardly facing deflecting surfaces extending around their entire periphery for obstructing creepage of electrolyte from the regions of said cell opening beyond the regions of said deflecting surfaces.

JASPER BAUM.